(12) United States Patent
Lee et al.

(10) Patent No.: US 7,977,892 B2
(45) Date of Patent: Jul. 12, 2011

(54) SOLID STATE LIGHTING APPARATUS

(75) Inventors: George Lee, Rowland Heights, CA (US); Arthur Young, Walnut, CA (US)

(73) Assignee: American Bright Lighting, Inc., Chino, CA (US)

( * ) Notice: Subject to any disclaimer, the term of this patent is extended or adjusted under 35 U.S.C. 154(b) by 0 days.

(21) Appl. No.: 12/979,046

(22) Filed: Dec. 27, 2010

(65) Prior Publication Data

US 2011/0089851 A1 Apr. 21, 2011

Related U.S. Application Data

(63) Continuation of application No. 11/890,718, filed on Aug. 7, 2007, now Pat. No. 7,859,196.

(51) Int. Cl.
*H05B 41/36* (2006.01)
(52) U.S. Cl. .............. 315/291; 315/299; 315/300
(58) Field of Classification Search .......... 315/185 R, 315/191, 192, 185 S, 200 R, 201, 200 A, 315/246, 247, 250, 291, 302, 307, 352; 362/362, 363, 367, 368, 372, 800
See application file for complete search history.

(56) References Cited

U.S. PATENT DOCUMENTS

| | | | |
|---|---|---|---|
| 2005/0068770 A1* | 3/2005 | Sloan et al. | 362/227 |
| 2006/0083038 A1* | 4/2006 | Lynch | 363/127 |
| 2007/0030678 A1* | 2/2007 | Bedson et al. | 362/249 |

* cited by examiner

*Primary Examiner* — Douglas W Owens
*Assistant Examiner* — Jianzi Chen
(74) *Attorney, Agent, or Firm* — Vic Y. Lin; Innovation Capital Law Group, LLP (57) ABSTRACT

A lighting apparatus includes a solid state lamp including one or more solid state lighting elements, and a power circuit including a current limiting device electrically connected to the lamp. The current limiting device configured to impose a maximum threshold on the current delivered to the lamp, wherein the current limiting device functions as essentially a constant current source. The lighting apparatus includes a housing for the power circuit and lamp, as a module unit.

15 Claims, 9 Drawing Sheets

SOLID STATE LIGHTING APPARATUS

RELATED APPLICATION

This is a continuation of application Ser. No. 11/890,718 filed on Aug. 7, 2007.

This application claims priority from U.S. Provisional Patent Application Ser. No. 60/926,140 filed Apr. 25, 2007 incorporated herein by reference in its entirety. This application further claims priority from U.S. Provisional Patent Application Ser. No. 60/926,476 filed Apr. 27, 2007, incorporated herein by to reference in its entirety.

FIELD OF THE INVENTION

The present invention relates to lighting applications, and in particular to solid state lighting.

BACKGROUND OF THE INVENTION

There has been an ongoing global proliferation of lighting products. Typical lighting products use one or more incandescent bulbs. Incandescent bulbs are inexpensive to buy, but generate 90% heat and merely 10% of light, which makes them inefficient and expensive to operate. Further, incandescent bulbs have a very short product life (typically 1000 hours).

Fluorescent lamps are more efficient than incandescent bulbs, but utilize hazardous materials such as mercury. In addition, fluorescent lamps require bulky ballasts that are costly, and make the fluorescent lamps unsuitable for smaller spaces. Further, fluorescent lamps perform poorly in low temperatures. Though fluorescent lamps exhibit longer life than incandescent bulbs, fluorescent lamps are more expensive than incandescent bulbs and still require frequent maintenance, which is fulfilled by intensive labor.

BRIEF SUMMARY OF THE INVENTION

The present invention provides a solid state lighting apparatus and assembly. In one embodiment, such a lighting apparatus includes a solid state lamp including one or more solid state lighting elements, and a power circuit including a current limiting device electrically connected to the lamp. The current limiting device is configured to impose a maximum threshold on the current delivered to the lamp, wherein the current limiting device functions as essentially a constant current source. The lighting apparatus includes a housing for the power circuit and lamp, as a module unit.

The power circuit further comprises a power converter electrically connected to the current limiting device, wherein the power converter is configured for converting AC power to DC power for the current limiting device. In one implementation, the power converter comprises a bridge rectifier for converting AC power to DC power for the current limiting device.

In one implementation, the power circuit is configured to deliver DC power to the lamp such that the lamp operates at less than 100% duty cycle from an AC line frequency. In an example, the power circuit is configured to deliver DC power to the solid state lamp such that the lamp operates at about 50% duty cycle from an AC line frequency.

At least one lighting element comprises an LED. Further, the lamp can comprise multiple LEDs chained as a single string circuit. The lamp can also comprise multiple LED string circuits chained in parallel, the apparatus comprising a current limiting device per LED string circuit, connected to the power circuit.

In another embodiment of the present invention provides a lighting assembly, comprising multiple solid state lighting apparatus units, as described. In another embodiment, the present invention provides a lighting assembly, comprising one or more solid state lighting apparatus units, each lighting apparatus unit comprising: a solid state lamp including one or more solid state lighting elements; a power circuit including a current limiting device electrically connected to the lamp, the current limiting device configured to impose a maximum threshold on the current delivered to the lamp, wherein the current limiting device functions as essentially a constant current source; bridge rectifier for converting AC power to DC power for the current limiting device; a circuit board including electrical traces such that the lamp and the power circuit are attached to the circuit board, and electrically connected via the circuit board; and a housing for one or more solid state lighting apparatus units, forming a modular unit. The modular unit has a form factor to fit into an existing lighting environment using existing power lines.

These and other features, aspects and advantages of the present invention will become understood with reference to the following description, appended claims and accompanying figures.

DETAILED DESCRIPTION OF THE PREFERRED EMBODIMENTS

The present invention provides a lighting apparatus using solid state lighting elements, for such application as replacing incandescent bulbs and fluorescent lamps, while providing more efficient, longer life lighting (50,000 hours typical) that is also environmentally friendly and compact.

The lighting apparatus further allows for more compact fabrication than in conventional incandescent and fluorescent lighting. The lighting apparatus can further be fabricated to fit into existing incandescent or fluorescent bulb form factors, which in turn allows the lighting apparatus to be easily fit into existing housing and wiring for incandescent or fluorescent lighting.

Figure 1:
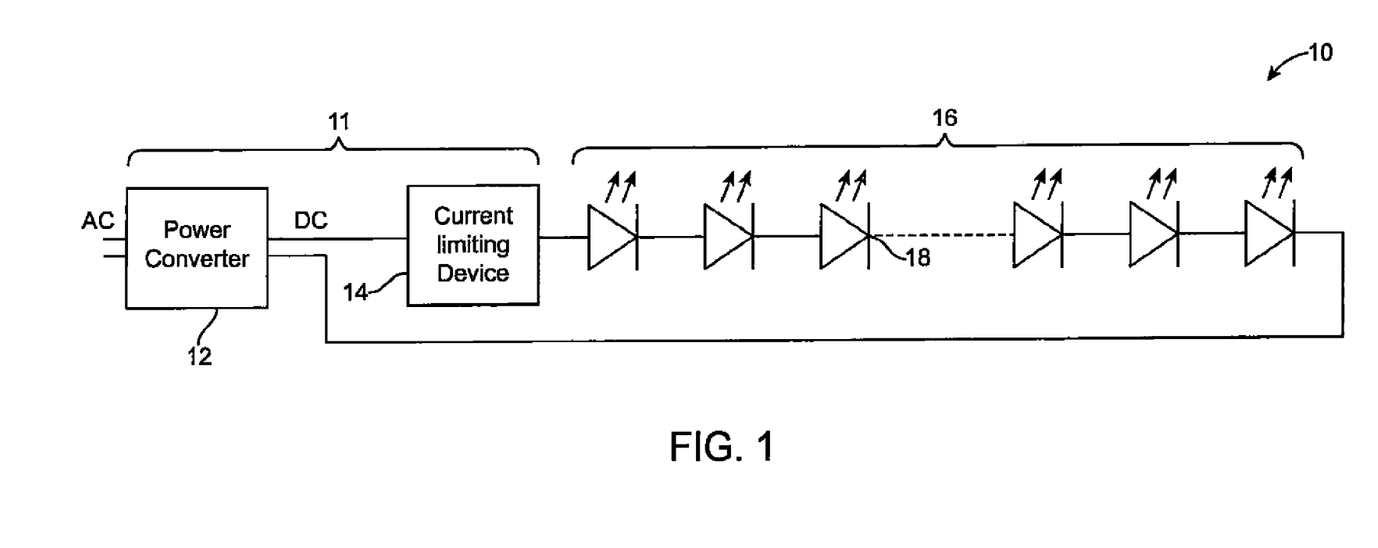
FIG. 1 shows a functional block diagram of an example lighting apparatus according to an embodiment of the present invention.

FIG. 1 shows an example functional block diagram of a lighting apparatus 10, according to an embodiment of the present invention. The lighting apparatus 10 comprises a power circuit 11 including a power converter 12, such as bridge a rectifier, that converts alternating current (AC) to direct current (DC).

The power circuit 11 further includes a current limiting device (current limiter) 14 and a solid state lamp 16 which includes one or more solid state lighting elements such as LEDs 18. The power circuit 11 and the LEDs 18 are connected in series.

Figure 2:
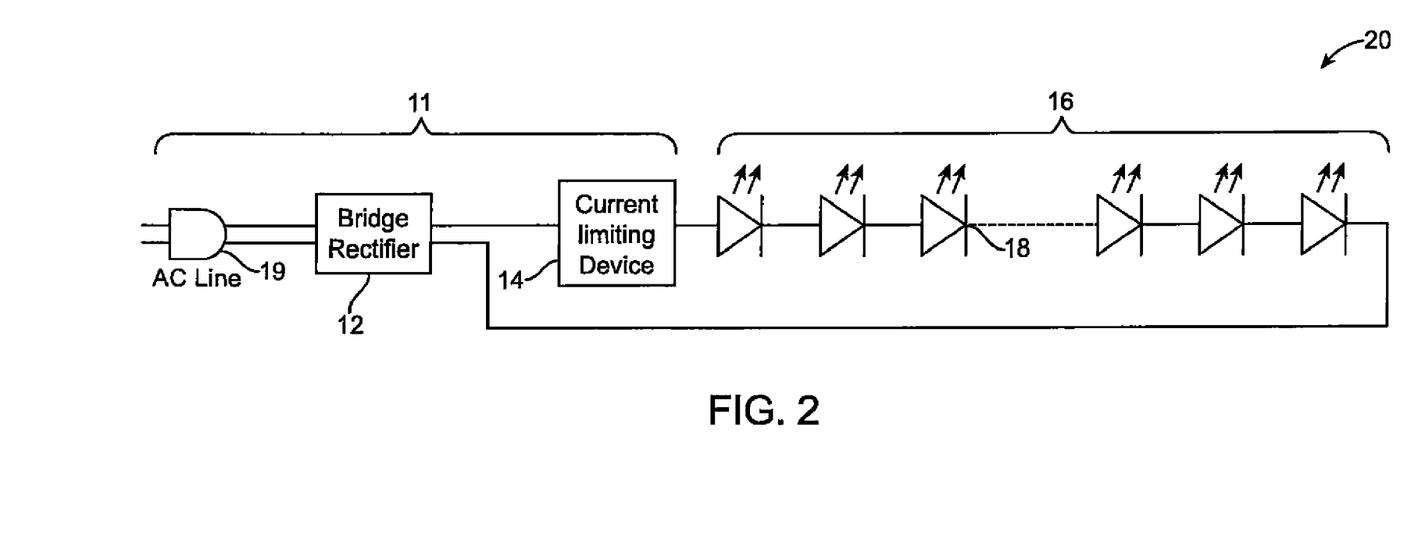
FIG. 2 shows a functional block diagram of another example lighting apparatus according to the present invention.

FIG. 2 shows another example lighting apparatus 20 according to the present invention, wherein the power circuit 11 further includes an AC line connection 19 to power lines such as an AC line in a typical home or office.

In either example, the current limiting device 14 imposes a maximum threshold on the current delivered to the lamp 16, thereby reducing the peak current that flows in the lamp 16. This reduces power consumption and/or prevents damage to the lighting elements 18 of the lamp 16.

The current limiting device 14 is preferably simple in design and compact in form, allowing modularization and space-saving form factors for the lighting apparatus it is used with. More preferably, the current limiting device 14 provides high voltage and functions as a constant current source, which is essentially unaffected by temperature variations.

Such a current limiting device for a lighting apparatus implementation according to the present invention, allows simplified power conversion steps in the power circuit, and provides overall size reduction. Therefore, the lighting apparatus allows a small/flexible form factor for modularization, and can be used for lighting in areas such as freezer cases, under-cabinet, display shelves, etc., wherein space is limited.

An example of the current limiting device 14 can be CL2 from Supertex, Inc., Sunnyvale, Calif. (specification published at http://www.supertex.com/pdf/datasheets/CL2.pdf). Yet another example of the current limiting device 14 can be regulator LM317 from Texas Instruments, Dallas, Tex. (specification published at http://focus.ti.com/lit/ds/symlink/lm317.pdf).

The power circuit 11 can be connected to an AC line, or in another embodiment where suitable DC power is available, the power converter 12 of the circuit 11 becomes unnecessary, such that the available DC power can be electrically coupled to the current limiting device 14.

Figure 3:
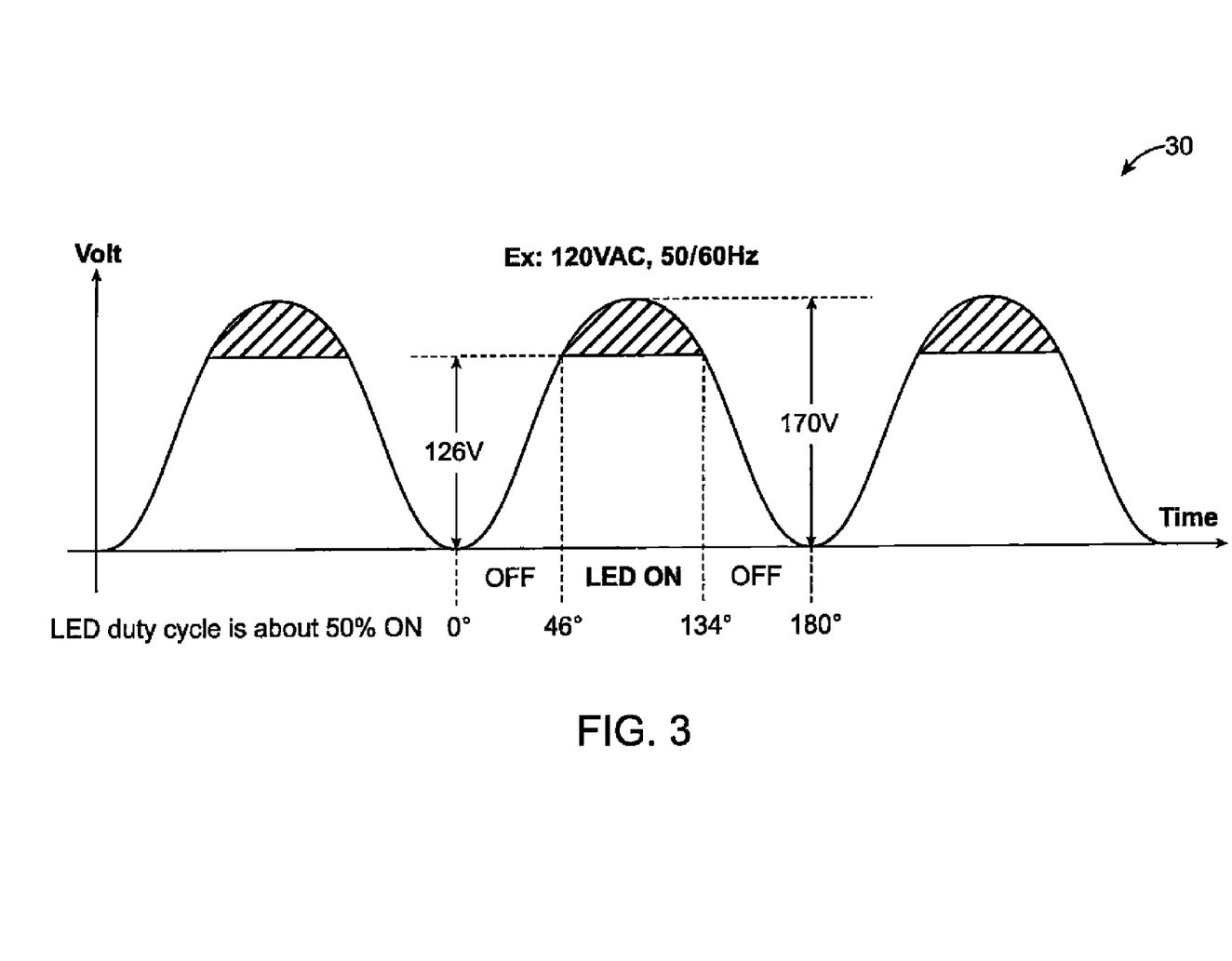
FIG. 3 shows an example graph of the duty cycle for the lighting elements, such as LEDs, in a lighting apparatus according to an embodiment of the present invention.

In an example implementation, the lighting apparatus 10 operates on 120V AC (a readily available household power source). The power converter 12 is implemented as a bridge rectifier that converts the 120V AC into a sine-wave 120V DC signal at 120 Hz, shown by an example graph 30 in FIG. 3. The current limiting device 14 has an operating range of 5 to 90V at 20 mA.

The number of LEDs determines the applicable line voltage, where:

Number of LEDs=(Supply voltage−Voltage drop of the current limiting device)/Voltage drop per LED.

When the voltage drop across the current limiting device is 45V, then for a 120V AC input, the peak supply voltage is: 170 V (peak)=120V AC×1.414. When the voltage drop per LED is 3.5 V, then:

Number of LEDs=(170 V (peak)−45V)/3.5V, or

Number of LEDs=125 V/3.5V=35.7 LEDs or 36 LEDs.

Since in this example the LEDs 18 operate at about 3.5V voltage drop for white LEDs, a total of 36 LEDs have a total voltage drop of 126V. Therefore, as shown by the example graph 30 in FIG. 3, the LEDs are turned ON only when the DC voltage applied to them is higher than 126V DC. The LEDs are connected in series to offset 75% of the line voltage, wherein a 50% duty cycle is achieved. With this simplified circuit, in a 120VAC application, a 50% duty cycle on the LEDs 18 from the AC line frequency prolongs the life of the LEDs and results in electrical energy savings. Other implementations with less than 100% duty cycle are within the scope of the present invention are possible.

Such a simplified LED circuit design can be modularized, scaled, expanded, reconfigured or replaced individually. As shown by the schematic in FIG. 4, in an example lighting apparatus 40 the current limiting device 14 is embedded in a modular assembly for the LEDs 18 on a circuit board 42 (e.g., printed circuit board). Electrical traces 44 on the board 42 connect the LEDs 18 and the current limiting device 14. Therefore, external ballasts or transformers are not required, resulting in a compact form factor for the lighting apparatus 40. The power converter 12 can also be placed on the circuit board 42, while maintaining the compactness. The circuit board 42 can be attached to a backplane 46 for structural support.

Figure 5:
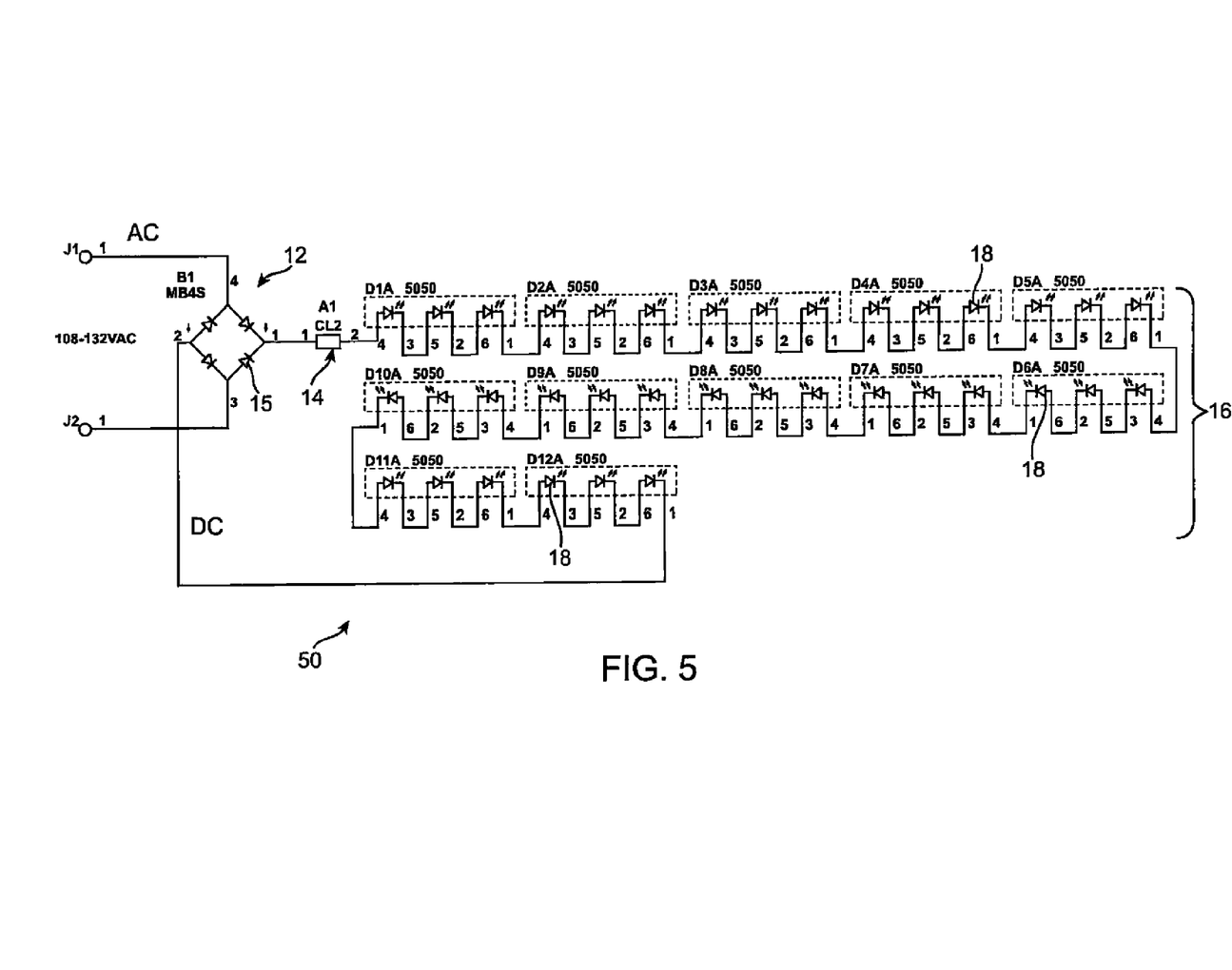
FIG. 5 shows a functional block diagram of a lighting assembly with multiple LED groups chained as a single string circuit, according to an embodiment of the present invention.

Further, a lighting assembly according to an embodiment of the present includes multiple modularized lighting apparatus units 10, chained in various arrangements for different applications. As shown by example in FIG. 5, an example lighting assembly 50 according to the present invention includes multiple LEDs 18 that are chained as a single string circuit. FIG. 5 further shows the power converter 12 as a bridge rectifier with 4 diodes 15 connected for AC to DC conversion, per graph 30 in FIG. 3.

Figure 6:
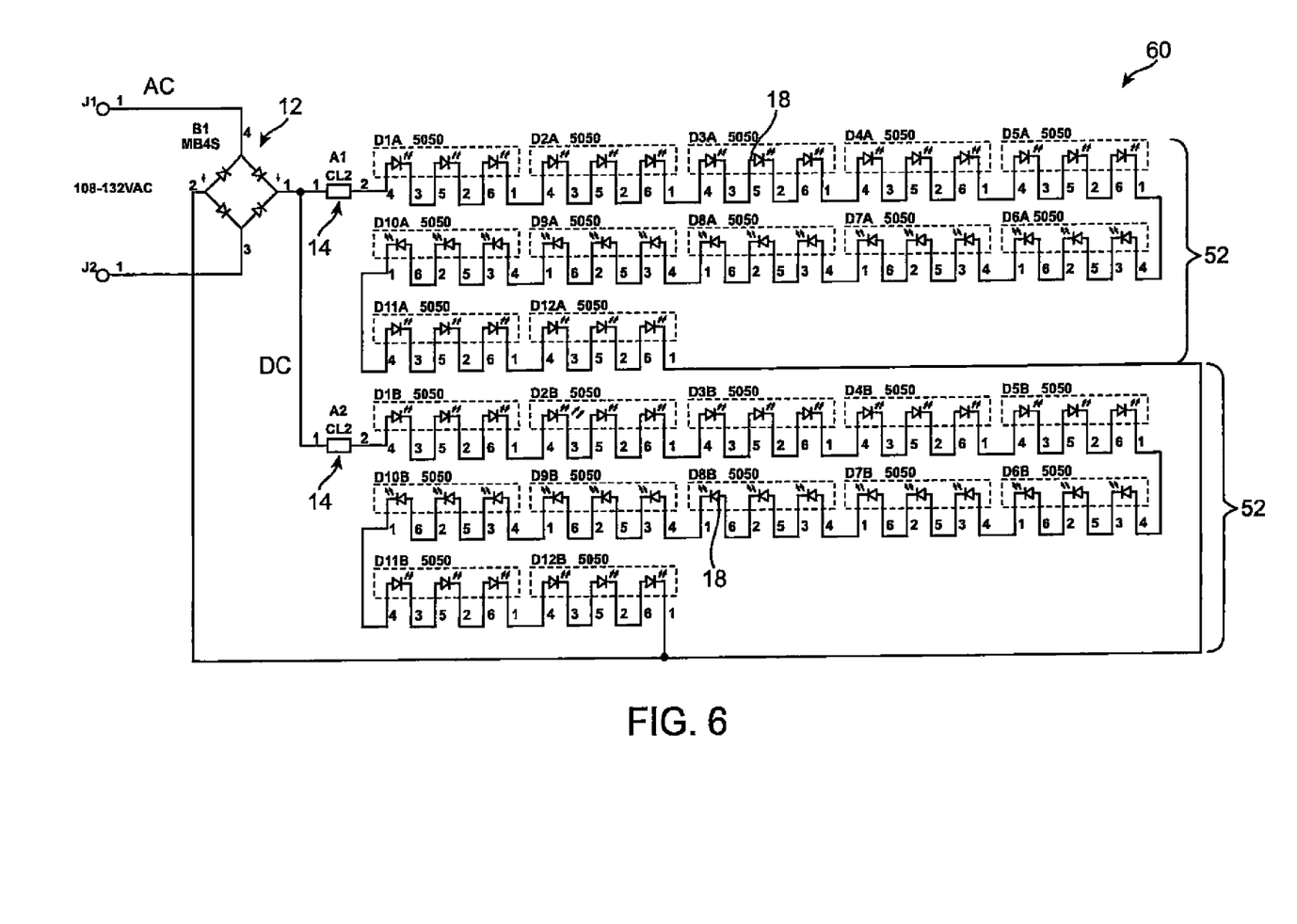
FIG. 6 shows a functional block diagram of a lighting assembly including multiple LED string circuits chained in parallel, according to an embodiment of the present invention.
Figure 7:
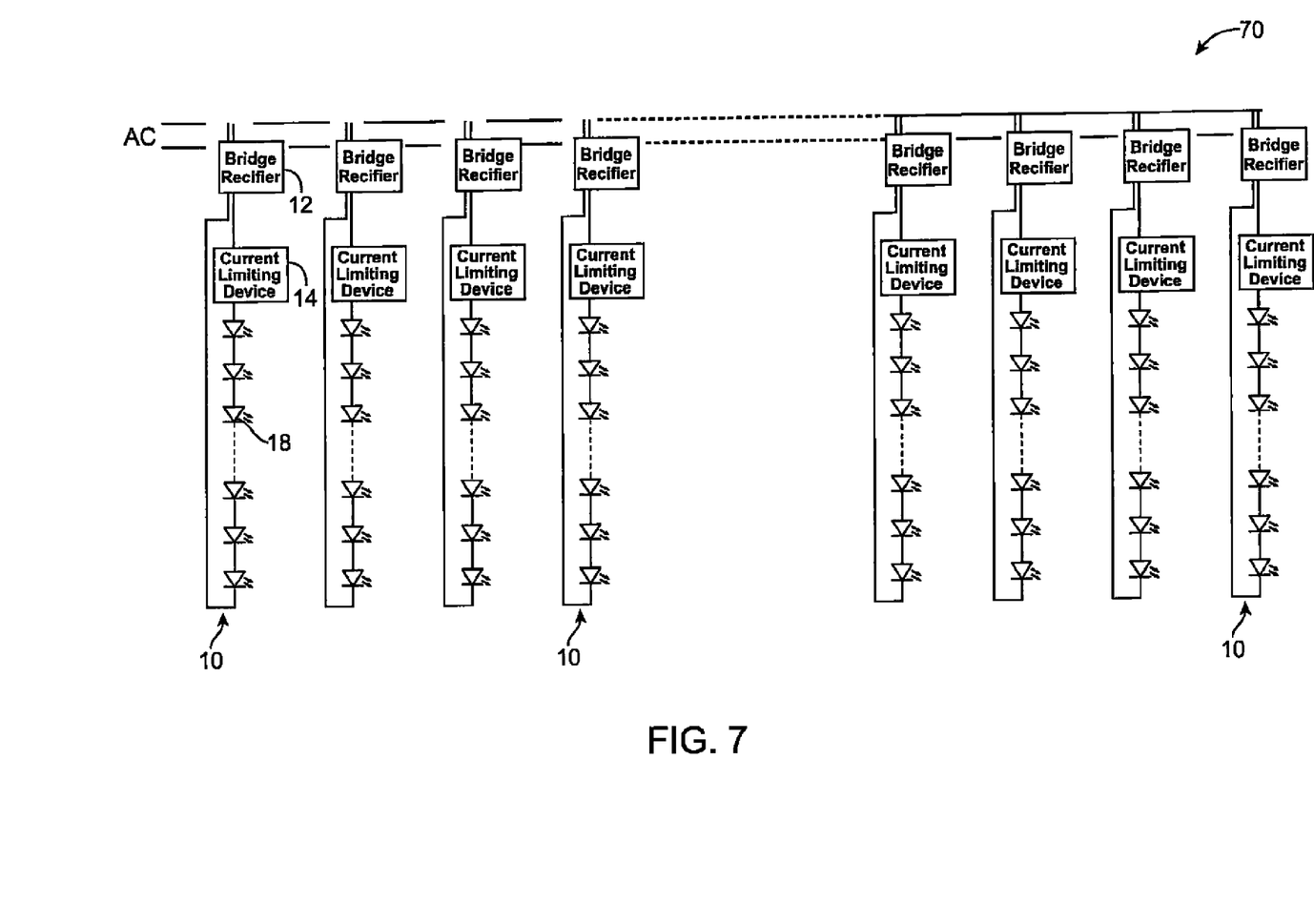
FIG. 7 shows a functional block diagram of a lighting assembly including multiple lighting apparatus units connected to an AC line in parallel, according to an embodiment of the present invention.

Referring to FIG. 6, another lighting assembly 60 according to an embodiment of the present includes multiple (e.g., two) string circuits 52 of LEDs 18, chained in parallel for form the solid state lamp. FIG. 7 shows another example lighting assembly 70 according to the present, including multiple lighting apparatus units 10 connected to an AC line in parallel.

Figure 4:
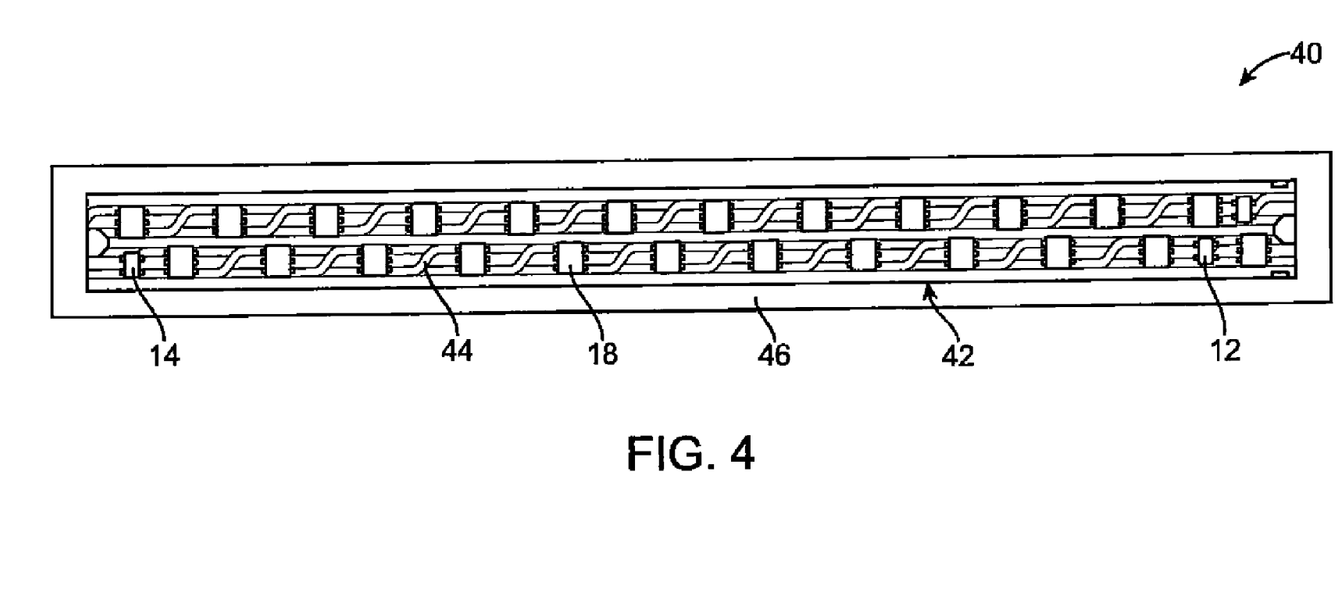
FIG. 4 shows a modular lighting apparatus according to an embodiment of the present invention.
Figure 8:
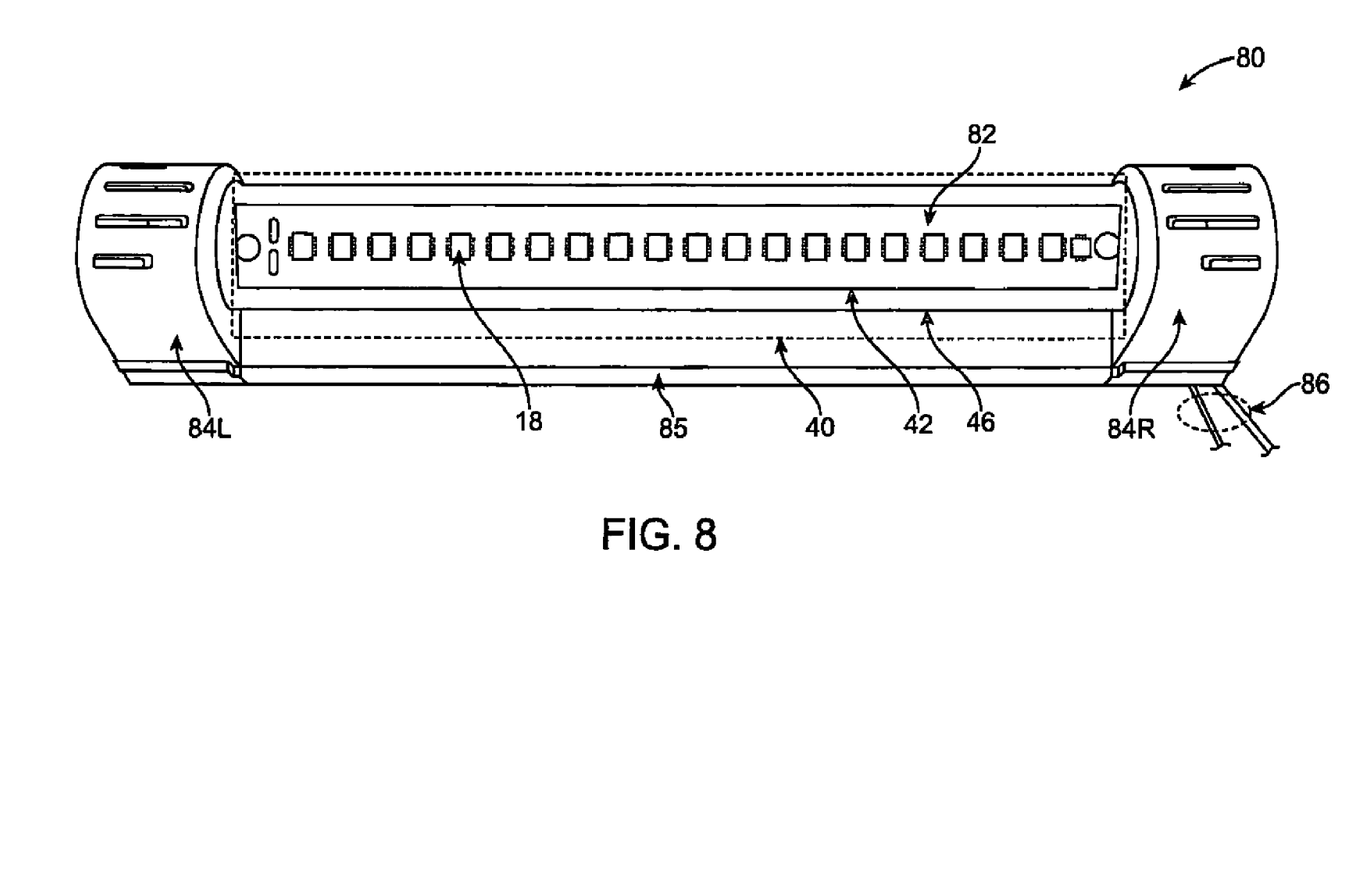
FIG. 8 shows a fabricated modular lighting unit including a lighting apparatus, according to an embodiment of the present invention.

FIG. 8 shows an example modular unit 80 including a solid state lighting apparatus, such as lighting apparatus 40 shown in FIG. 4, according to the present invention. In the modular unit 80, the lighting apparatus 40 is placed in a housing 82 that can be held by ends 84L, 84R of a holder 85, with power lines 86 connected to the power circuit of the lighting apparatus 40.

As shown in FIG. 8, essentially the entire lighting apparatus 40 (including the current limiter, LEDs and bridge rectifier) is placed in the housing 82 as modular unit, which can then be "dropped" into an existing holder 85 for making electrical contact with the power lines, or can be used in another manner. The housing 82 can have a form factor such as tubular (as in florescent applications), essentially spherical (as in incandescent bulb applications), etc. The housing 82 can be transparent, opaque, etc.

Figure 9:
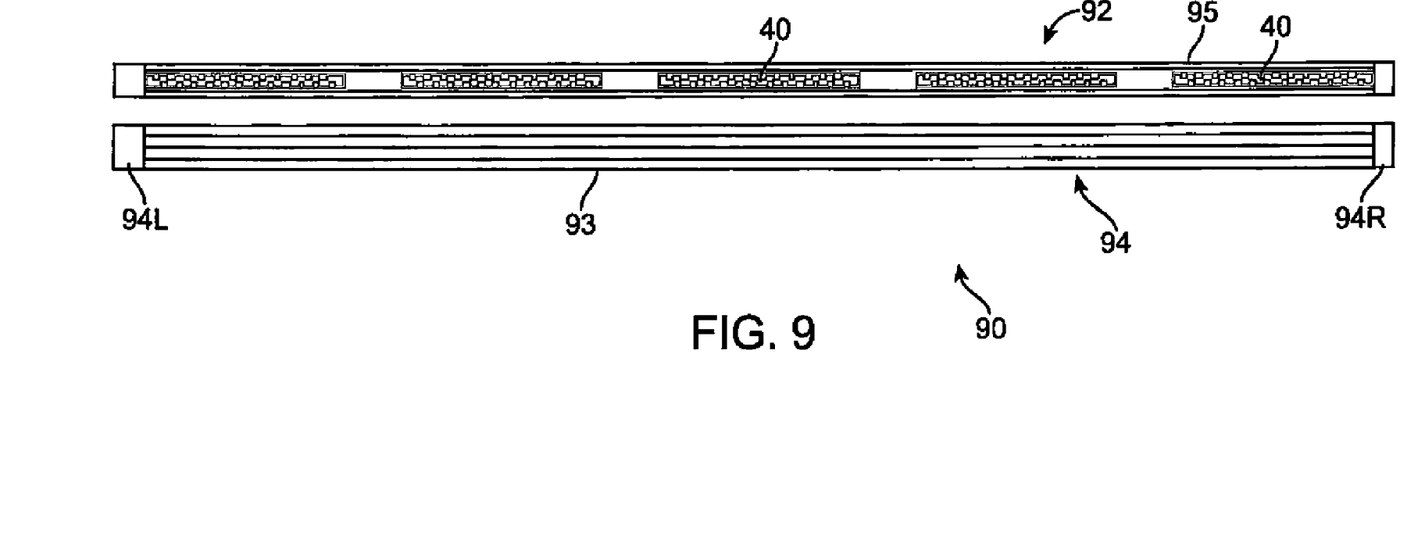
FIG. 9 shows a schematic of an example lighting assembly comprising a lighting module fabricated to fit into a typical fluorescent lamp housing, according to an embodiment of the present invention.

FIG. 9 shows an example lighting assembly 90 comprising a lighting module 92 according to the present invention, which is fabricated to fit into a typical fluorescent lamp housing 94, having holders 94L, 94R at opposing ends of a supporting member 93, for holding the corresponding ends of the lighting module 92. The lighting module 92 includes five lighting apparatus units 40 (FIG. 4), which can be electrically connected to AC power in a serial chain or parallel, and housed in a transparent housing 95. For example, the lighting module 92 can be 60 inches long end-to-end (the tubular module 95 being 57¼ inches long), and 1⅜ inches wide. Other examples are possible.

Without bulky ballasts, switching mode converters or transformers, a lighting apparatus according to the present invention can be applied in new installations or fit into existing lamp fixtures for replacing existing devices, without additional requirements or changes to the surrounding environment. While the SSL industry is still focused on high power LEDs (which makes the driving circuits and the finished product bulky), in one embodiment the present invention uses fewer number of low powered LEDs along with a current limiting device having a low current rating, as a combination that is low power generates essentially minimal heat.

The present invention has been described in considerable detail with reference to certain preferred versions thereof; however, other versions are possible. Therefore, the spirit and scope of the appended claims should not be to limited to the description of the preferred versions contained herein.

What is claimed is:

1. A power circuit for use in connection with a LED lamp lighting elements, comprising:
   a power converter that is configured for converting AC power to pulsed DC power; and
   an active current limiting control circuit that is electrically connected in series with the lamp, the active current limiting control circuit receiving the pulsed DC power, the active current limiting control circuit configured to impose a constant level on the current delivered to each lighting element of the LED lamp during at least a fractional portion of each power cycle when voltage across the active current limiting control circuit and lighting elements of the lamp equals or exceeds the total required voltage drop such that the lamp turns ON, wherein the active current limiting control circuit functions as essentially a constant current source while the lamp is ON.

2. The power circuit of claim 1, wherein the power converter comprises a bridge rectifier for converting AC power to pulsed DC power for the active current limiting device and providing a 120 Hz working frequency from a 60 Hz power source.

3. The power circuit of claim 2, wherein the bridge rectifier converts an AC signal into a sine-waved DC signal.

4. The power circuit of claim 2, wherein the power circuit is configured to deliver pulsed DC power to the solid state lamp such that the solid state lamp operates at less than 100% duty cycle from an AC line frequency.

5. The power circuit of claim 2, wherein the power circuit is configured to deliver pulsed DC power to the solid state lamp such that the solid lamp operates at about 50% duty cycle from an AC line frequency.

6. The power circuit of claim 2, wherein the power circuit is configured to deliver pulsed DC power to the lamp such that the lamp operates at about 50% duty cycle from an 120 VAC line frequency.

7. The power circuit of claim 2, wherein the bridge rectifier converts 120 V AC to a sine-wave 120 V DC signal.

8. The power circuit of claim 1, further comprising a circuit board including electrical traces such that the lamp and the power circuit are attached to the circuit board, and electrically connected via the circuit board.

9. The power circuit of claim 1, further comprising:
   a circuit board including electrical traces such that the lamp and the power circuit are attached to the circuit board, and electrically connected via the circuit board.

10. The power circuit of claim 1, wherein the active current limiting control circuit includes overload protection.

11. The power circuit of claim 1, wherein the active current limiting control circuit is temperature compensated.

12. A power circuit for use in connection with a solid state lamp having lighting elements that each require a voltage drop to light, the solid state lamp turning ON only when a voltage across it equals or exceeds a total required voltage drop that is about the sum of the voltage drops required by each of the plurality of solid state lighting elements, comprising:
   a bridge rectifier for converting AC power to pulsed DC power; and
   an active current limiting control circuit that is electrically connected in series with the solid state lamp, the active current limiting control circuit configured to impose a maximum threshold on the current delivered to the solid state lamp during at least a fractional portion of each power cycle when the voltage across the active current limiting control circuit and solid state lamp equals or exceeds the total required voltage drop such that the solid state lamp turns ON, wherein the active current limiting control circuit functions as essentially a constant current source; and
   a circuit board including electrical traces such that the solid state lamp and the power circuit are attached to the circuit board, and electrically connected via the circuit board.

13. The power circuit of claim 12, wherein the active current limiting control circuit is temperature compensated.

14. The power circuit of claim 12, wherein the active current limiting control circuit includes overload protection.

15. The power circuit of claim 12, wherein the bridge rectifier converts 120 V AC to a sine-wave 120 V DC signal.

* * * * *